Figures 1, 2:
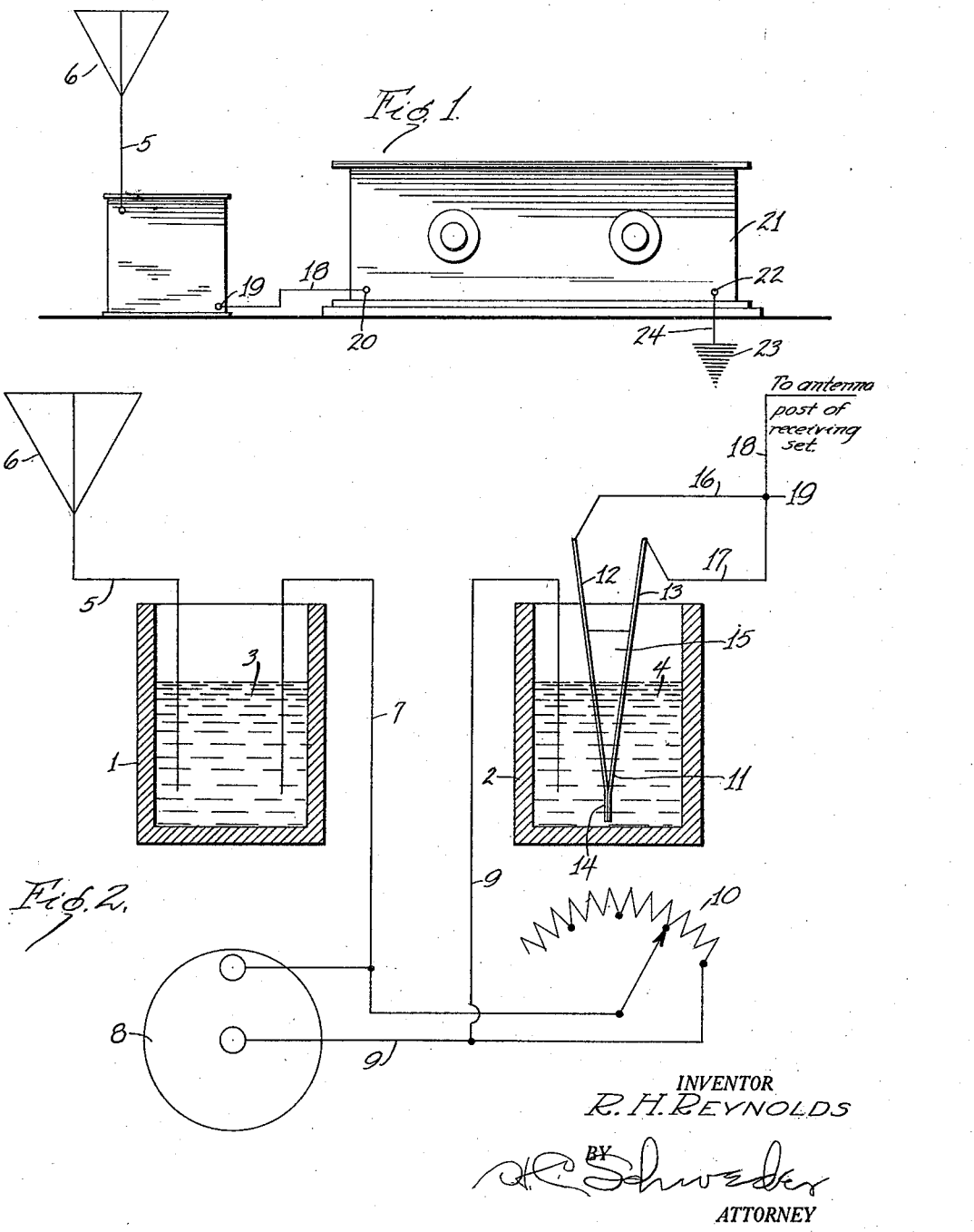

Nov. 5, 1929.  R. H. REYNOLDS  1,734,146

RADIO APPARATUS

Filed Oct. 6, 1926

INVENTOR
R. H. REYNOLDS
BY
ATTORNEY

Patented Nov. 5, 1929

1,734,146

UNITED STATES PATENT OFFICE

RALPH H. REYNOLDS, OF WALNUT CREEK, CALIFORNIA

RADIO APPARATUS

Application filed October 6, 1926. Serial No. 139,893.

My invention relates to improvements in static eliminators for radio receiving sets, and it consists in the combinations, constructions, and arrangements, hereinafter described and claimed.

An object of my invention is to provide a device of the type described which may be readily attached to a receiving set without the necessity of altering the construction of the latter.

Other objects and advantages will appear in the following specification, and the novel features of the invention will be particularly pointed out in the appended claims.

My invention is illustrated in the accompanying drawings, forming a part of this application, in which—

Figure 1 is a view showing the device operatively connected to a receiving set, and Figure 2 is a wiring diagram of the device.

In carrying out my invention, I provide containers 1 and 2 each containing a brine solution 3 and 4 respectively. A wire 5 leads from the brine 3 to an aerial 6. A second wire 7 leads from the brine 3 to one terminal of a battery 8.

From the other terminal of the battery 8, a wire 9 leads to the brine 4 in the container 2. The radio frequency current flowing from the aerial 6 and thru the wires 5, 7, and 9, is superposed upon the direct current flowing through the circuit connected to the battery 8. The strength of the current from the battery 8 is controlled by a rheostat 10.

In the brine 4, I dispose a thermocouple 11. The bar 12 of the thermocouple is preferably made of German silver, while the bar 13 is made of copper. These bars are connected to each other at 14 and are separated from each other by an insulating material 15.

Wires 16 and 17 lead from the bars 12 and 13 and are connected to a common wire 18 at 19. The wire 18, in turn, is connected to the antenna binding post 20 of the receiving set 21. The receiving set 21 may be of any standard make and has its usual ground terminal 22 connected to the ground 23 by means of a wire 24.

From the foregoing description of the various parts of the device, the operation thereof may be readily understood. It will be noted that the circuit for the incoming signals is provided by means of the aerial 6, wire 5, brine 3, wire 7, battery 8, wire 9, brine 4, rods 12 and 13, wires 16 and 17, and wire 18. I have found out, from practice, that the brine solutions 3 and 4, together with the battery 8, and the thermocouple, actually eliminates all static and permits only signals of a desired frequency to pass thru the circuit undisturbed.

A local current is generated in the wires 16 and 17 and the rods 12 and 13, due to the fact that the rods 12 and 13 have their lower ends disposed in the relatively cool brine solutions while their upper ends are, of course, of a warmer temperature. The theory of the thermocouple would apply in this case and cause the local current to flow thru the wires 16 and 17 and the rods 12 and 13 as aforesaid. This local current has a peculiar effect in aiding in the elimination of all static disturbances.

I claim:

1. A device of the type described comprising a container having a solution of brine therein, an electrical conductor dipped in said solution and connected to an aerial, a second container having a solution of brine therein, electrical conductors for connecting said first and second solutions of brine, a source of direct current in series with said electrical conductors, a thermocouple dipped in the solution of brine in said second container, the dry ends of said thermocouple being connected to an antenna connection of a radio receiving set.

2. A device of the type described comprising a container having a solution of brine therein, an electrical conductor dipped in said solution and connected to an aerial; a second container having a solution of brine therein, electrical conductors for conencting said first and second solutions of brine, current generating means connected in series with said electrical conductors; a thermocouple dipped in the solution of brine in said second container, the dry ends of said thermocouple being connected to an antenna connection of a radio receiving set.

3. A device of the type described comprising a container having a solution of brine therein, an electrical conductor dipped in said solution and connected to an aerial; a second container having a solution of brine therein, electrical conductors for connecting said first and second solutions of brine, current generating means connected in series with said electrical conductors, means for controlling the flow of current from said generating means; and a thermocouple dipped in the solution of brine in said second container, the dry ends of said thermocouple being connected to an antenna connection of a radio receiving set.

4. A device of the type described comprising a circuit interposed between the aerial and the antenna connection of a receiving set, said circuit including two containers, each having a solution of brine therein, a source of direct current, said solutions being connected in series with each other, the aerial being connected to one solution; and a thermocouple dipped in the other solution and connected to said antenna connection.

5. A device of the type described comprising a circuit interposed between the aerial and the antenna connection of a receiving set, said circuit including two containers, each having a solution of brine therein, said solutions being electrically connected in series with each other, the aerial being connected to one solution; a thermocouple dipped in the other solution and connected to said antenna connection; and a direct current source connected in series between said solutions of brine.

6. A device of the type described comprising a circuit interposed between the aerial and the antenna connection of a receiving set, said circuit including two containers, each having a solution of brine therein, said solutions being electrically connected in series with each other, the aerial being connected to one solution; a thermocouple dipped in the other solution and connected to said antenna connection; a battery connected in series between said solutions of brine; and a rheostat for controlling the flow of current therethrough.

7. A device of the type described, comprising a container having a solution of brine therein, a wire electrically connected to an aerial and dipped into the solution of brine; a second container having a brine solution therein; a source of current, one terminal thereof being connected to the brine solution in said first container, the other terminal thereof being connected to the brine solution in said second container; a rheostat for controlling the flow of current therefrom; a thermocouple dipped in the brine solution in the second container, and wires leading from the thermocouple to an antenna binding post of a receiving set for conveying a local current from said thermocouple thereto.

In testimony whereof I affix my signature.
RALPH H. REYNOLDS.